HIGH PERMEABILITY MAGNETIC FILM STRUCTURE

Filed Dec. 19, 1967 2 Sheets-Sheet 1

INVENTORS A. H. BOBECK
F. B. HAGEDORN
H. M. SHAPIRO

BY Herbert M. Shapiro
ATTORNEY

HIGH PERMEABILITY MAGNETIC FILM STRUCTURE

Filed Dec. 19, 1967 2 Sheets-Sheet 2

United States Patent Office 3,543,249
Patented Nov. 24, 1970

3,543,249

HIGH PERMEABILITY MAGNETIC FILM STRUCTURE

Andrew H. Bobeck, Chatham, Fred B. Hagedorn, Berkeley Heights, and Herbert M. Shapiro, Somerville, N.J., assignors to Bell Telephone Laboratories, Incorporated, Murray Hill, N.J., a corporation of New York Filed Dec. 19, 1967, Ser. No. 691,852
Int. Cl. G11c *11/14, 17/00*
U.S. Cl. 340—174 11 Claims

ABSTRACT OF THE DISCLOSURE

High small-signal permeabilities are provided by a lamellate magnetic film structure in which one or more domain walls are pinned into an intermediate layer via exchange coupling between the magnetization in each of two bounding layers contiguous therewith and the magnetization in the surface regions of that intermediate layer. Not only are high small-signal permeabilities exhibited but also stable high and relatively low small-signal permeabilities are provided controllably. The ratio between the high and low permeability states is, ideally, several orders of magnitude.

FIELD OF THE INVENTION

This invention relates to magnetic devices and, more particularly, to devices including high permeability magnetic layers.

BACKGROUND OF THE INVENTION

Magnetic materials are attractive because of the useful hysteresis curves characteristic thereof. This characteristic enables such materials to be employed extensively in, for example, memory circuits wherein the materials are switched between first and second remanent conditions representing binary one and zero values as is well known.

The hysteresis characteristic is a measure of change in flux with change in applied magnetic field. When the material is in the remanent condition, change in flux in response to a change in field is small and the material is said to exhibit a low permeability. In a demagnetized condition the change in flux in response to changes in field is relatively high and the material is said to have a relatively high permeability. Unfortunately, the relatively high permeability exhibited by magnetic materials in the demagnetized condition is in response to relatively large changes in field unless the material is processed in a known but complicated and thus expensive manner.

But, a small-signal high permeability is a characteristic which is desirable and, in thin film form, is particularly suitable, as for example, an inductance for integrated or monolithic semiconductor circuits. Bulk materials which exhibit small-signal high permeabilities are known, of course. However, such materials in a thin film form necessary for integrated circuit use, for example, do not exhibit the desired high permeability characteristics.

A prime object of this invention then is to provide a new and novel magnetic device characterized by a small-signal high permeability.

More specifically, an object of this invention is to provide a magnetic thin film structure which exhibits a small-signal high permeability.

The invention is based on the realization that magnetic permeability can be a measure of the movement of domain walls and that permeability is typically high if the domain walls which are present in the material will move in response to small changes in applied field. This is the case when well annealed bulk magnetic material is demagnetized and thus the material exhibits a relatively high permeability.

BRIEF DESCRIPTION OF THE INVENTION

The foregoing and further objects of this invention are realized in one embodiment thereof wherein a first film of magnetic material is coated on a first surface with a high coercive force second film having its magnetization in a first easy direction and exhibiting a high uniaxial anisotropy. The second (opposite) surface of the first film is coated with a third film having a second coercive force also higher than the coercive force of the first film but lower than that of the second film, and also exhibiting a high uniaxial anisotropy. The magnetization of the third film is in a direction opposite to that of the second. Ferromagnetic exchange coupling across the interface between the first and second films requires the magnetization at the first surface of the first film to align with the magnetization of the second film. The magnetization at the second surface of the first film, by the same token, aligns with the magnetization of the third film. In this manner, at least one domain wall is provided in the plane of the first film and is pinned into that film by exchange coupling to the second and third films. Large changes in flux are exhibited by the structure in resopnse to small changes in field providing the desired high permeability if the structure meets certain conditions discussed in more detail below.

The structure is stable not only in the high permeability condition just described, but also in a lower permeability condition to which it is switched by a reversal of the magnetization in the third film. The ratio of the permeabilities in the two stable states is, ideally, several orders of magnitude.

Accordingly, another object of this invention is to provide a new and novel magnetic device exhibiting stable low and relatively high small-signal permeabilities.

A feature of this invention is a multilayered structure wherein a domain wall is pinned into a magnetic film via exchange coupling between that film and second and third films each contiguous therewith.

Another feature of this invention is a multilayered structure wherein a plurality of domain walls is pinned into a magnetic film via exchange coupling between that film and second and third films each contiguous therewith.

Still another feature of this invention is an integrated or monolithic semiconductor circuit including a multilayered magnetic thin-film inductor.

A further feature of this invention is a memory circuit element comprising a multilayered thin-film structure and means selectively switching the structure from low to high permeability conditions.

BRIEF DESCRIPTION OF THE DRAWING

The foregoing and further objects and features of this invention will be understood more fully from a consideration of the following detailed description rendered in conjunction with the accompanying drawing in which.

DETAILED DESCRIPTION

Figure 1:
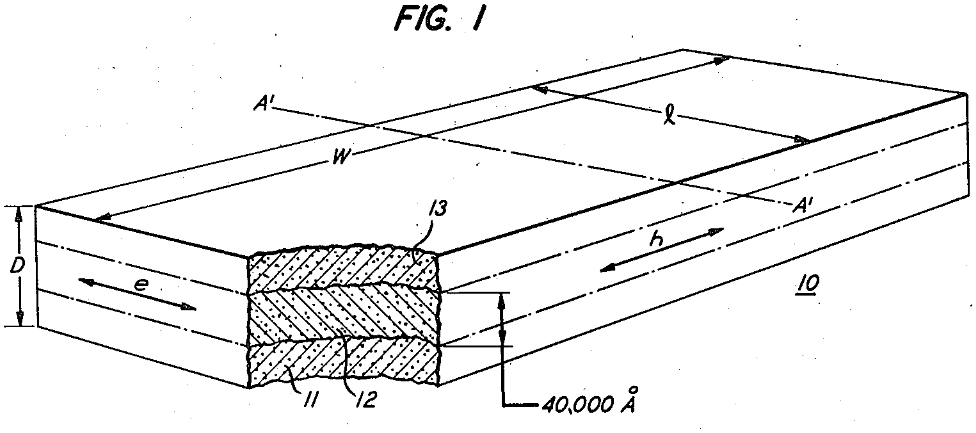
FIG. 1 is a plan view partially in cross section of a multilayered magnetic film structure in accordance with this invention.

FIG. 1 shows a lamellate magnetic structure 10 including three layers of magnetic material 11, 12, and 13. The intermediate layer 12 is typically an anisotropic layer of, for example, Permalloy having easy and hard axes shown by the double-ended arrows designated *e* and *h*, respectively. The thickness of layer 12 is typically on the order of 40,000 angstrom units and the thickness of each of layers 11 and 13 is about 10,000 angstrom units. Films 11 and 13 are illustratively 55 percent nickel, 30 percent cobalt and 15 percent iron by weight, deposited by well-known deposition techniques such as by sputtering, evaporation, or electrodeposition onto a condensing surface, not shown.

Figure 2:
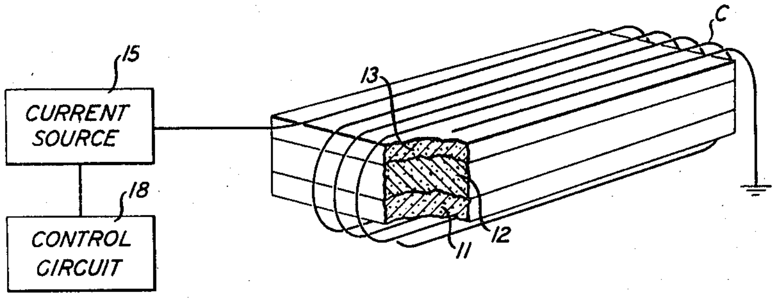
FIGS. 2, 3, and 4 are schematic views of the structure of FIG. 1 showing various magnetic conditions thereof.

FIG. 2 shows the lamellate structure 10 of FIG. 1 encompassed by a coil C which in practice may comprise a single turn conductor. Coil C is connected between a current source 15 and ground and is positioned to generate a magnetic field along the easy axis in structure 10 when a current flows therein.

Figure 3:
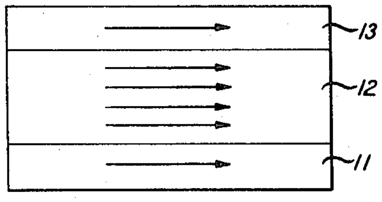

FIG. 3 shows a cross section of the structure of FIG. 1 taken along section line A–A'. Let us assume that layer 13 has the highest coercive force (and uniaxial anisotropy) of the three layers (the smaller of these parameters being) say about 20 oersteds. Layer 12 is assumed to have the lowest, say about two oersteds. Layer 11 is assumed to have an intermediate coercive force of about 15 oersteds.

The magnetic configuration of the structure of FIG. 1 depends on the directions of magnetization in the layers 11 and 13. Those directions are determined by the fields generated by currents in coil C. If a negative current flows in coil C and that current is of a magnitude to switch flux in layer 13, all flux in the entire structure is in a direction indicated by the arrows in FIG. 3. That is to say, the entire structure 10 is saturated to the right as viewed in the figure. If now a positive current flows in coil C, and that current is insufficient to switch flux in layer 13 but sufficient to switch flux in layer 11, the flux in layer 11 reverses as indicated by the leftward directed arrow in the representation of layer 11 in FIG. 4.

The magnetization in the surfaces of layer 12 is constrained by exchange forces to align with the magnetization in the adjacent layers 11 and 13. But the magnetization orientations in those layers are illustratively opposite to one another. Thus the magnetization orientations in the surfaces of layer 12 are opposite to one another along easy axis orientations. But a gradual transition of the magnetization between those extreme orientations is required by quantum mechanical exchange forces. Consequently, next consecutive spins rotate incrementally further into the hard direction and back to the easy direction with increasing distance from one surface to the other as is well understood.

Figure 4:
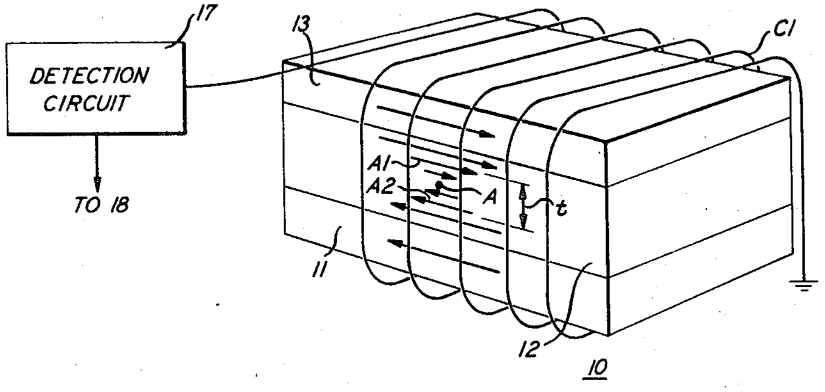

This variation in magnetization orientation is represented in FIG. 4 by shorter and shorter arrows with increasing distance from layer 11 depicting flux orientations increasingly into the hard axis and a dot A which represents flux oriented in the hard direction. The arrows become longer and longer thereafter until the surface of layer 13 is reached. The resulting magnetic configuration is similar to the familiar domain wall configuration and the dot represents the mean position of the domain wall.

Easy direction fields of different magnitude rotate the magnetization in the domain wall corresponding amounts. Each such field, accordingly displaces the mean position of the wall. That is to say, a field of a first magnitude may rotate the magnetization in the wall until the flux represented by arrow A1 of FIG. 4 is rotated into the hard direction. On the other hand, a field of a second magnitude may rotate the magnetization in the wall until the flux represented by arrow A2 of FIG. 4 is rotated to the hard direction. The mean position of the wall, then, may be displaced over a distance *t* in response to easy direction fields of differing magnitudes. Of course, if the applied field were sinusoidal, the mean position of the wall would vary over the distance *t* in a corresponding manner.

But a change in the mean position of the wall constitutes a change in net flux along the easy direction. Such a change in flux, $d\phi$, responsive to a change in applied field, $dH$, is proportional to the effective permeability of the entire structure. As long as the domain wall is present in the structure, high permeability is insured. As long as the coercive forces and effective anisotropy fields of layers 11 and 13 are not exceeded, the wall remains pinned into layer 12.

A coil C1 encompasses structure 10 as shown in FIG. 4. Coil C1 is connected between a detection circuit 17 and ground and is oriented with respect to structure 10 to detect changes in flux.

Current source 15 and circuit 17 of FIGS. 2 and 4, respectively, are connected to a control circuit 18 (see FIG. 2). The various sources and circuits may be any such elements capable of operating in accordance with this invention.

We have now discussed a lamellate thin film structure, the pinning of a domain wall therein, and the changing of the mean position of the wall in response to changes in applied magnetic field. We will now discuss the mathematical considerations to provide an estimate of the permeability and inductance realized with the structure of FIG. 1 before discussing the utilization in an illustrative circuit.

Let us assume a threshold, $H_c$, for wall motion of less than or equal to $10^{-2}$ oersteds for the case where the effects of pinning sites are negligible. Let us also assume a soft magnetic film which has a saturation induction $B_s$. The distance a wall moves in response to a $10^{-2}$ oersted field from its zero field position is designated X for this calculation. The flux change induced by this field change is $$2B_sWX \tag{1}$$

where W is the width of the film as shown in FIG. 1. This flux change is equated to that obtained from an imaginary film of the same cross-sectional size WD:

$$\frac{2B_sX}{D}=B_s' \tag{2}$$

where $B_s'$ is the effective induction of the imaginary film. The permeability is $$\mu=\frac{dB_s'}{dH}=\frac{2B_sX}{DH_c} \tag{3}$$

For $B_s=10^4$ gauss (for permalloy films), $H_c=10^{-2}$ oersteds, and $X/D=10^{-1}$, the relative (with respect to air) permeability $\mu_r=2\times10^5$.

For high permeability materials it is reasonable to assume end-effects to be negligible. Under such an assumption, the inductance L of a single sheet inductor surrounding a rectangular volume of WLD, where current is always perpendicular to the *l* dimension is $$L=\frac{\mu WD}{l} \tag{4}$$

In MKS units, $$\mu=\mu_r\times4\pi\times10^{-7}$$

If $\mu_r=10^5$ and if W is about equal to *l* (a square element) and if D is about 100,000 angstrom units ($10^{-5}$ meters) then $$L=4\pi\times10^{-7}\times10^5\times10^5\approx1\ \mu\text{h, (microhenries)} \tag{5}$$

The advantages achieved in accordance with this invention depend on the domain wall movement being constrained to distances small compared to the spacing between wall pinning points in the structure. This constraint insures that the effect of pinning points is negligible. Specifically, the film occupied by the domain wall is of a thickness small compared to the typical distance between (crystal) pinning points. That is to say, for a reasonable distance between pinning points of say 500,000 angstrom units in Permalloy, an intermediate film in FIG. 1 may be about 30,000 to 50,000 angstrom units. The reason for this geometry is that the wall motion threshold of a domain wall in a magnetic material is determined by the disposition of the pinning points. In the relative absence of such points, the wall motion threshold is nearly zero. Thus, the geometry of a lamellate structure in accordance with this invention is chosen to insure that the film occupied by a single domain wall is sufficiently thin to exhibit essentially no wall motion threshold.

In order to achieve a magnetically stable structure, however, it is necessary for an intermediate film to exceed a minimum thickness. At suitable thicknesses above this minimum, adequate wall motion can occur without undue restraint by exchange coupling.

Even well annealed bulk materials may benefit in accordance with this invention by including contiguous films to pin domain walls therein. Pinning sites in bulk structures may be spaced apart $10^{-2}$ centimeters. Thus, the layer in which a domain wall (or walls) is pinned may be as much $10^{-3}$ centimeters thick.

In order to insure that the magnetic condition shown in FIG. 4 is realized, it is helpful for coil C to be adapted for rotation about an axis normal to the films shown in FIG. 1. A conventional magnetometer is useful to this end. Such an implementation permits the "winding" of the magnetization into the desired configuration and eases the material parameter constraints thus permitting the use of films well within the capabilities of practical present-day film deposition techniques.

In an alternative mode for establishing the magnetic configuration shown in FIG. 4, a current is applied directly to the structure of FIG. 1. Current flows along the hard axis generating fields in opposite easy directions in films 11 and 13. The current is applied concurrent with a hard direction field. In this mode, films 11 and 13 may be substantially identical (viz.: having like coercive force).

Figure 5:
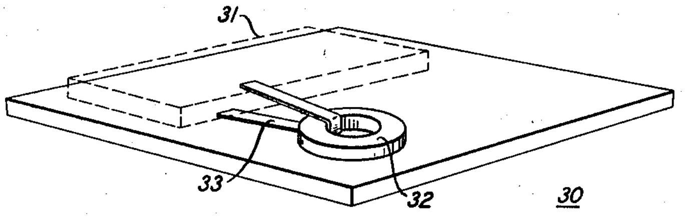
FIG. 5 is a schematic illustration of a circuit arrangement for the structure of FIG. 1.

FIG. 5 shows a generalized monolithic circuit 30 employing a lamellate thin magnetic film inductor in accordance with this invention. The circuit is represented by broken block 31, and may comprise a filter network for which an inductance is desired. The lamellate film structure of FIG. 1 provides the requisite inductance and in this instance is deposited in the form of an annulus 32 having a circular easy axis. Connection to the annulus is made by a single conductor turn 33 conveniently by beam lead technology. At a convenient operating cycle time in the 10 megacycle range, an annulus having an 0.015 inch outside diameter and a thickness of about 20,000 angstrom units exhibits a relative permeability of about $2\times10^5$ and provides the 0.1 microhenry requisite in such circuits.

An additional use for the structure of FIG. 1 suggests itself when FIG. 3 is compared to FIG. 4. In the former, no wall is present; in the latter, a wall is present. The magnetic configuration of the structure may then be switched between low and high permeability states as shown in FIGS. 3 and 4, respectively. The switching operation is carried out in a manner to unwind the magnetization thus avoiding the formation of what are called 360° walls as is discussed further hereinafter. Ideally, the ratio of the permeabilities of the two states is several orders of magnitude, a property useful for memory devices.

Figure 6:
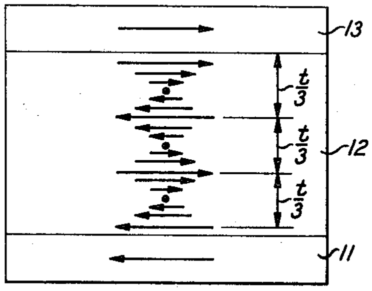
FIGS. 6, 7, and 8 are schematic illustrations of alternate magnetic configurations for structures of the type shown in FIG. 1.

The structure of FIG. 1 may be driven magnetically to include more than one domain wall by, for example, the rotating magnetometer technique mentioned above. A three wall configuration is shown in FIG. 6, for example. The walls are formed in the manner already described but, of course, may be moved over distances less than $t/3$ shorter than possible with the single wall structure as is obvious to one skilled in the art. Many walls moving shorter distances permit a given change in magnetization in a shorter time thereby improving the frequency response over the structure of FIG. 1. Further, adjacent walls have magnetic configurations resembling a helix and forming 360° walls. Walls of this configuration are not easily annihilated as is well known.

Figure 7:
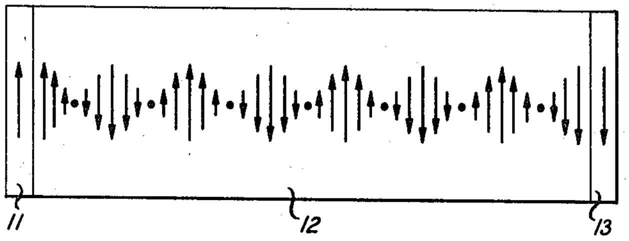

FIG. 7 shows a structure including a large number of walls. As the number of walls increase, the permeability and the upper frequency limit increase further permitting a tailoring of the parameters of the structure to circuit requirements.

In more quantitative terms, the frequency response of a device in accordance with this invention is a function of, inter alia, the number of walls therein. The velocity, $v$, of a wall equals the mobility, $\beta$, of the wall times the applied field H. The displacement $\Delta X$ of the wall time $\Delta t$ then equals $\beta H \Delta t$. For permalloy, $\beta$ is about equal to $10^4$ cm./sec. oe. For $H=10^{-2}$ oersteds and $\Delta=10^{-6}$ sec., $\Delta X=10^{-4}$ cm. Thus, one wall gives an inductance $L=1\ \mu$h. with frequencies up to a megacycle. If the structure includes additional walls, higher frequencies are achieved.

Eddy current effects begin to become important for a D (see FIG. 1) of about 100,000 angstrom units for a frequency of about 10 megacycles in permalloy. For higher frequency devices a high resistivity magnetic film such as yttrium iron garnet (YIG) is particularly useful.

Figure 8:
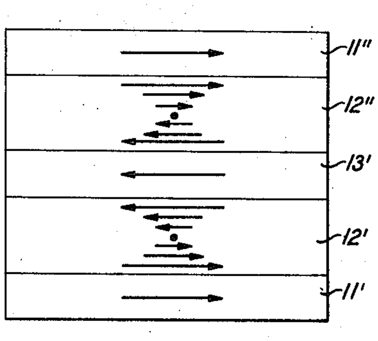

Multiple wall structures may assume the form of a plurality of multiple film structures as shown in FIG. 1. FIG. 8 shows one such arrangement where two structures as shown in FIG. 1 share a film 13. Prime designations are employed to preserve the analogy with FIG. 1. Thus, layers 11′ and 13′ sandwich a layer 12′ and layers 11″ and 13′ sandwich a layer 12″. The magnetization of layers 11′ and 11″ is opposite to that of layer 13′ thus permitting high permeability operation as discussed hereinbefore. If layers 11′ and 11″ have different coercive forces, however, it is possible to switch the magnetization of one and not the other. Thus, a three-state device is provided exhibiting a high, intermediate (down by a factor of two), and low permeability characteristic.

What have been discussed are considered to be only illustrative of the principles of this invention, and it is to be understood that numerous other arrangements may be desired by one skilled in the art without departing from the spirit and scope of this invention.

What is claimed is:

1. A lamellate magnetic structure comprising a first layer of anisotropic magnetic material having first and second surfaces, and second and third layers of anisotropic magnetic materials contiguous said first and second surfaces respectively, said second layer having a coercive force higher than that of said first layer and lower than that of said third layer, said second and third layers when driven to opopsite magnetic states imposing opposite magnetization conditions in said first layer at said first and second surfaces respectively, thus forming a domain wall therebetween.

2. First and second lamellite magnetic structures in accordance with claim 1 having a common second layer.

3. A structure in accordance with claim 1 wherein said first layer has a thickness narrow compared to the spacing between material defects which provide domain wall pinning points therein.

4. A structure in accordance with claim 3 wherein said first layer has a thickness of about 50,000 angstrom units or less.

5. A structure in accordance with claim 4 wherein said first, second and third layers have easy and hard axes in substantial alignment.

6. A structure in accordance with claim 5 in combination with means for selectively driving the magnetization in said second and third layers to opposite states along said easy axis in a manner to provide a plurality of domain walls in said first layer.

7. A structure in accordance with claim 5 in combination with means for selectively driving the magnetization in said second and third layers to opposite states along said easy axes in a manner to provide a domain wall in said first layer.

8. A combination in accordance with claim 7 also including means for detecting the movement of said domain wall in response to changes in an applied magentic field.

9. A combination in accordance with claim 8 wherein said lamellate structure is apertured to form an annulus.

10. A magnetic structure comprising a first layer of magnetic material having first and second surfaces, and second and third layers of magnetic material contiguous said first and second surfaces respectively, said first layer including at least one domain wall therein, and being of a thickness such that domain walls therein are displaced distances small compared to the separation between domain wall pinning points in response to applied magnetic fields, said second and third layers being of materials to pin domain walls within said first layer.

11. A magnetic structure in accordance with claim 10 wherein said first layer includes a plurality of domain walls.

References Cited

UNITED STATES PATENTS 3,092,813 6/1964 Broadbent ---------- 340—174

OTHER REFERENCES

Publication I—IBM Technical Disclosures Bulletin, vol. 10, No. 2, July 1967, p. 144.

BERNARD KONICK, Primary Examiner

S. B. POKOTILOW, Assistant Examiner